(12) United States Patent
Courchay et al.

(10) Patent No.: US 11,970,673 B2
(45) Date of Patent: *Apr. 30, 2024

(54) WATER-SOLUBLE UNIT DOSE ARTICLE

(71) Applicant: The Procter & Gamble Company, Cincinnati, OH (US)

(72) Inventors: Florence Catherine Courchay, Brussels (BE); Steven G. Friedich, Vancouver, WA (US); Regine Labeque, Neder-Over-Heembeek (BE); Shigeng Li, Naperville, IL (US); Luca Vitiello, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/551,220

(22) Filed: Dec. 15, 2021

(65) Prior Publication Data

US 2022/0186156 A1 Jun. 16, 2022

(30) Foreign Application Priority Data

Dec. 15, 2020 (EP) ..................................... 20214392

(51) Int. Cl.
*C11D 17/04* (2006.01)
*C11D 3/37* (2006.01)
*C11D 11/00* (2006.01)

(52) U.S. Cl.
CPC .......... *C11D 17/045* (2013.01); *C11D 3/3753* (2013.01); *C11D 2111/12* (2024.01)

(58) Field of Classification Search
CPC .. C11D 17/045; C11D 3/3753; C11D 11/0017
See application file for complete search history.

(56) References Cited

U.S. PATENT DOCUMENTS

| | | | | |
|---|---|---|---|---|
| 10,619,042 B2* | 4/2020 | Labeque | ................. | B65B 47/02 |
| 10,745,655 B2* | 8/2020 | Courchay | ............ | C11D 17/045 |
| 11,473,039 B2* | 10/2022 | Souter | .................... | B29C 51/02 |
| 2015/0336691 A1* | 11/2015 | Fowler | .................. | B65D 65/46 |
| | | | | 53/553 |
| 2017/0233539 A1* | 8/2017 | Friedich | ................ | C08L 29/04 |
| | | | | 510/296 |
| 2017/0298216 A1* | 10/2017 | Labeque | ........... | B65D 81/3261 |
| 2017/0369822 A1* | 12/2017 | Souter | .................. | A23K 20/105 |
| 2018/0002647 A1* | 1/2018 | Souter | .................... | B65D 65/46 |
| 2019/0376010 A1* | 12/2019 | Salaam | ................ | C11D 17/042 |
| 2020/0308515 A1* | 10/2020 | Vitiello | ................. | B32B 27/306 |
| 2020/0308516 A1* | 10/2020 | Vitiello | ............... | C11D 11/0023 |

(Continued)

FOREIGN PATENT DOCUMENTS

| | | | | |
|---|---|---|---|---|
| CA | 3024877 A1 * | 12/2017 | ........... | A23K 20/105 |
| WO | WO-2017218402 A1 * | 12/2017 | ........... | A23K 20/105 |

OTHER PUBLICATIONS

All Office Actions; U.S. Appl. No. 17/551,218, filed on Dec. 15, 2021.

(Continued)

*Primary Examiner* — Nicole M. Buie-Hatcher
*Assistant Examiner* — M. Reza Asdjodi
(74) *Attorney, Agent, or Firm* — Andrew J. Mueller; Gregory S. Darley-Emerson

(57) ABSTRACT

Water-soluble unit dose article and a method of making.

18 Claims, 2 Drawing Sheets

(56) References Cited

U.S. PATENT DOCUMENTS

2022/0186156 A1* 6/2022 Courchay ........... C11D 11/0017
2022/0186159 A1* 6/2022 Courchay ............ C11D 3/3753

OTHER PUBLICATIONS

All Office Actions; U.S. Appl. No. 17/551,222, filed on Dec. 15, 2021.
Extended European Search Report and Search Opinion; Application No. 20214392.1 ; dated May 25, 2021; 06 pages.
Unpublished U.S. Appl. No. 17/382,725, filed Dec. 15, 2021, to first inventor Florence Catherine Courchay et. al.
Unpublished U.S. Appl. No. 17/551,218, filed Dec. 15, 2021, to first inventor Florence Catherine Courchay et. al.
PCT Search Report and Written Opinion for PCT/US2021/063423 dated Mar. 21, 2022, 16 pages.

* cited by examiner

WATER-SOLUBLE UNIT DOSE ARTICLE

FIELD OF THE INVENTION

Water-soluble unit dose article and a method of making.

BACKGROUND OF THE INVENTION

Water-soluble unit dose articles are liked by consumers as they are convenient and efficient to use. Such water-soluble unit dose articles often comprise detergent compositions. Without wishing to be bound by theory, when the water-soluble unit dose article is added to water, the film dissolves/disintegrates releasing the internal contents into the surrounding water to create a wash liquor. The film used must meet the dual criteria of providing sufficient strength such that it does not rip or tear resulting in premature rupture of the water-soluble unit dose article during storage and transport, but also adequately dissolves during the wash cycle to minimise unwanted film residues at the end of the wash operation. Films comprised of polyvinyl alcohol have been used to meet these needs. A preferred method of making such unit dose articles is to deform a first water-soluble film into a mould to create an open cavity, fill the open cavity with a detergent composition, then close the open cavity with a second water-soluble film and seal the first and second water-soluble films together to create the water-soluble unit dose article.

There is an increasing desire to wash fabrics under more environmentally friendly conditions, such as shorter wash cycles and cooler wash temperatures. Under such conditions, unit dose articles made using traditional water-soluble films (which primarily comprise polyvinyl alcohol homopolymers), can suffer from incomplete dissolution during the wash cycle resulting in undissolved film material remaining and depositing onto articles to be washed.

Efforts have previously been made to overcome this issue. U.S. Pat. No. 10,619,042 teaches a water-soluble unit dose article comprising a water-soluble film comprising a polyvinyl alcohol (PVOH) resin blend comprising: a first PVOH polymer comprising carboxylated anionic monomer units, vinyl alcohol monomer units and optionally vinyl acetate monomer units, wherein the carboxylated anionic monomer unit is present in the first PVOH polymer in an amount of from about 3 mol. % to about 6 mol. %, a second PVOH polymer consisting essentially of vinyl alcohol monomer units and optionally vinyl acetate monomer units, wherein the first PVOH polymer is present in an amount in a range from about 10 wt. % to about 70wt. % of total PVOH polymers in the film. Such water-soluble unit dose articles provide both excellent dissolution yet also acceptable structural integrity.

However, an issue encountered with such unit dose articles is that rather than a failure in the structural integrity of the film itself, failures can occur in the seal between the first and second water-soluble films. Such failure can result in premature rupture of the water-soluble unit dose article.

Therefore, there is a need in the art for a water-soluble unit dose article that provides reduced seal failures as compared to U.S. Pat. No. 10,619,042 yet also maintains structural integrity of the film itself and dissolution profiles comparable with those of U.S. Pat. No. 10,619,042.

It was surprisingly found that a water-soluble unit dose article according to the present invention achieved this. This is even more surprising considering that the second water-soluble film comprises a higher degree of polyvinyl alcohol homopolymer, which the skilled person would expect to result in reduced dissolution under short and cold wash cycles.

SUMMARY OF THE INVENTION

A first aspect of the present invention is a water-soluble unit dose article comprising at least a first compartment and a household care composition, wherein the household care composition is housed in the at least first compartment, wherein the unit dose article comprises;
  a. A first water-soluble film, wherein the first water-soluble film has a first side and a second side, and wherein the first water soluble film comprises a first polyvinyl alcohol (PVOH) resin wherein the first polyvinyl alcohol resin comprises:
    i. between 1% and less than 65%, preferably between 10% and 64% preferably between 20% and 60% more preferably between 30% and 50% by weight of the first polyvinylalcohol resin of a first polyvinyl alcohol polymer comprising carboxylated anionic monomer units, vinyl alcohol monomer units and optionally vinyl acetate monomer units; and wherein the carboxylated anionic monomer unit is derived from a member selected from the group consisting of maleic acid, monoalkyl maleate, dialkyl maleate, maleic anhydride, and combinations thereof;
    ii. between 35% and 99%, preferably between 35% and 90% preferably between 40% and 80% more preferably between 50% and 70% by weight of the first polyvinylalcohol resin of a second PVOH polymer wherein the second PVOH polymer is a homopolymer wherein the homopolymer consists of vinyl alcohol monomer units and optionally vinyl acetate monomer units;
  b. A second water-soluble film, wherein the second water-soluble film has a first side and a second side, and wherein the second water-soluble film comprises a second polyvinyl alcohol resin wherein the second polyvinyl alcohol resin comprises;
    i. Less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
    ii. From 85% to 100% by weight of the second polyvinyl alcohol resin of a polyvinyl alcohol homopolymer or a homopolymer blend, wherein the homopolymers consist of vinyl alcohol monomer units and optionally vinyl acetate monomer units;
wherein the second polyvinyl alcohol resin has an average 4% solution viscosity in deionised water at 20 ° C. in a range of between 8 mPa·s and less than 12 mPa·s; and wherein the first side of the first water-soluble film is sealed to the second side of the second water-soluble film to create the at least first compartment between the first water-soluble film and the second water-soluble film.

A second aspect of the present invention is a process of making a water-soluble unit dose article according to any preceding claims, comprising the steps of;
  a. deforming the first water-soluble film in a mould to create an open cavity via thermoforming, vacuum forming, or a combination thereof;

b. Filling the at least one open cavity with the household care composition;
c. Closing the open filled cavity with the second water-soluble film;
d. sealing the first water-soluble film and the second water-soluble film to create the water-soluble unit dose article, preferably wherein the first water-soluble film and the second water-soluble film are sealed via solvent sealing, more preferably wherein a solvent sealing solution is applied to the second side of the second water-soluble film ahead of sealing the films together, wherein the second side of the second water-soluble film faces the first water-soluble film.

DETAILED DESCRIPTION OF THE INVENTION

Water-Soluble Unit Dose Article

Figure 1:
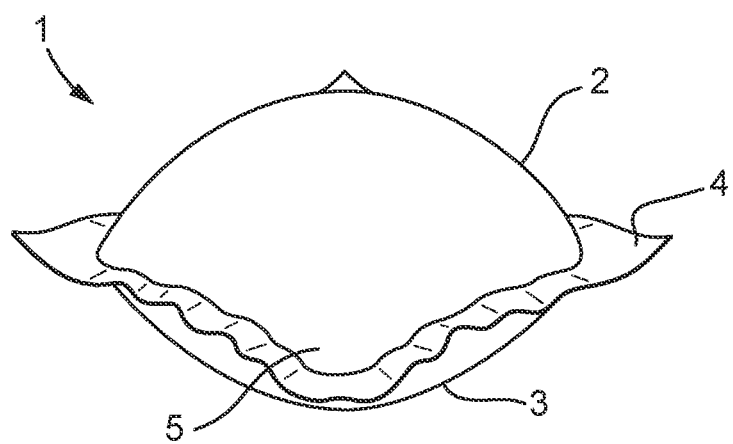
FIG. 1 is a water-soluble unit dose article according to the present invention.

A first aspect of the present invention is a water-soluble unit dose article. The water-soluble unit dose article comprises at least a first compartment and a household care composition. The household care composition is housed in the at least one compartment. The household care composition is described in more detail below. The water-soluble unit dose article comprises a first water-soluble film and a second water-soluble film and optionally a third water-soluble film. The first water-soluble film, the second water-soluble film and the optional third water-soluble films are described in more detail below.

The water-soluble unit dose article comprises water-soluble film shaped such that the unit-dose article comprises at least one internal compartment surrounded by the water-soluble film. The water-soluble unit dose article is constructed such that the household care composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the household care composition.

The first water-soluble film has a first side and a second side. The second water-soluble film has a first side and a second side. The optional third water-soluble film has a first side and a second side.

The first side of the first water-soluble film is sealed to the second side of the second water-soluble film to create a first compartment between the first water-soluble film and the second water-soluble film. Optionally, the first side of the second water-soluble film is sealed to the second side of the third water-soluble film to create at least a second compartment between the second water-soluble film and the third water-soluble film, and wherein the second compartment is positioned above the first compartment.

Preferably, the first water-soluble film and the second water-soluble film are sealed via solvent sealing, heat sealing or a mixture thereof, preferably via solvent sealing. More preferably, the solvent sealing solution comprises an aqueous solvent, a non-aqueous solvent or a mixture thereof. Even more preferably, the solvent sealing solution comprises water. Preferably, the solvent sealing solution comprises at least 95%, or even at least 98%, or even at least 99%, or even 100% by weight of the solvent sealing solution of water. The solvent sealing solution can be applied to a film by any suitable method, including contact and/or non-contact methods. For example, the solvent solution can be applied in a contact transfer process, e.g. using a contact member comprising a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. The sealing solution can be applied using a contact member comprising an absorbent material, for example natural felt, synthetic felt, porous plastic, foam, sponge, microfiber, cotton, polyester, extruded polyester fibers, nonwoven webs and the like, e.g. in pad or roller form. The sealing solution can be applied via a dosing nozzle or a spraying nozzle. Combinations of any of the foregoing methods and apparatus are contemplated. Preferably, the solvent sealing solution is applied via a felt roll, via a dosing nozzle, a spraying nozzle or a combination thereof, more preferably via a felt roll. Preferably, the solvent sealing solution is applied to the second side of the second water-soluble film, the second side of the second water soluble film facing the first side of the first water-soluble film.

Preferably, the second water-soluble film and the optional third water-soluble film are sealed via solvent sealing, heat sealing or a mixture thereof, preferably via solvent sealing. More preferably, the solvent sealing solution comprises an aqueous solvent, a non-aqueous solvent or a mixture thereof. Even more preferably, the solvent sealing solution comprises water. Preferably, the solvent sealing solution comprises at least 95%, or even at least 98%, or even at least 99%, or even 100% by weight of the solvent sealing solution of water. The solvent sealing solution can be applied to a film by any suitable method, including contact and/or non-contact methods. For example, the solvent solution can be applied in a contact transfer process, e.g. using a contact member comprising a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. The sealing solution can be applied using a contact member comprising an absorbent material, for example natural felt, synthetic felt, porous plastic, foam, sponge, microfiber, cotton, polyester, extruded polyester fibers, nonwoven webs and the like, e.g. in pad or roller form. The sealing solution can be applied via a dosing nozzle or a spraying nozzle. Combinations of any of the foregoing methods and apparatus are contemplated. Preferably the solvent sealing solution is applied via a felt roll, via a spraying or dosing nozzle, or a combination thereof, more preferably via a felt roll. Preferably, the solvent sealing solution is applied to the first side of the second water-soluble film, the first side of the second water soluble film facing the second side of the third water-soluble film.

It was surprisingly found that wherein the films according to the prior art are sealed via solvent sealing, there is a tendency for the solvent sealing solution to not deposit homogeneously on the water-soluble film prior to sealing. Without wishing to be bound by theory, wherein two films are intended to be sealed together, the solvent sealing solution needs to be applied to at least one of the films. If the solvent sealing solution does not provide a homogeneous layer on the film that it is applied to then this can result in weaker seals between the two films leading to seal failure and premature rupture of the water-soluble unit dose article. It was surprisingly found that in the unit dose articles according to the present invention, a more uniform/homogeneous layer of solvent sealing solution was obtained between the water-soluble films to be sealed, resulting in reduced seal failures. Without wishing to be bound by theory, it is believed that addition of the solvent sealing solution onto a water-soluble film can create a thin foam layer. This thin foam layer results in a non-homogeneous layer of the solvent sealing solution being present on the water-soluble film, resulting in premature seal failure. It was surprisingly found that addition of the solvent sealing solution to the second water-soluble film according to the present invention resulted in reduction or even absence of the foam layer, and as such reduction in instances of seal failure.

Optionally, the unit dose article comprises at least a third compartment, preferably at least a third and a fourth compartment between the second water-soluble film and the third water-soluble film. Preferably, the second compartment and the third compartment, preferably the second compartment, the third compartment and the fourth compartments are positioned side-by-side to one another and the second compartment and the third compartment, preferably the second compartment, the third compartment and the fourth compartment are positioned above the first compartment. Preferably, the second and third compartments, or the second, third and fourth compartments are smaller than the first compartment. The second and third compartments, or the second, third and fourth compartments may be the same size as one another or may be different sizes. Some of the compartments may be the same size and some may be different sizes.

The household care composition according to the present invention may be comprised in at least one of the compartments. It may for example be comprised in just one compartment, or may be comprised in two compartments, or even in three compartments, or even in four compartments.

Each compartment may comprise the same or different compositions. The different compositions could all be in the same form, or they may be in different forms.

FIG. 1 discloses a water-soluble unit dose article (1) according to the present invention. Shown are the first water-soluble film (2) and the second water-soluble film (3) which are sealed together at a seal region (4). The liquid laundry detergent composition (5) is comprised within the water-soluble soluble unit dose article (1).

Preferably, the water-soluble unit dose article is coated with a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

First Water-Soluble Film

The water-soluble unit dose article comprises a first water-soluble film. The first water-soluble film of the present invention is soluble or dispersible in water. The first water-soluble film preferably has a thickness prior to deformation of from 20 to 150 micron, preferably 35 to 125 micron, even more preferably 50 to 110 micron, most preferably about 76 micron. The first water-soluble film has a first side and a second side.

Preferably, the first water-soluble film has a water-solubility of at least 50%, preferably at least 75% or even at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The first water-soluble film material may be obtained by casting, blow-moulding, extrusion or blown extrusion of the polymeric material, as known in the art, preferably the first water-soluble film is a solvent casted water-soluble film.

The first water soluble film comprises a first polyvinyl alcohol (PVOH) resin wherein the first polyvinyl alcohol resin comprises;

i. between 1% and less than 65%, preferably between 10% and 64% preferably between 20% and 60% more preferably between 30% and 50% by weight of the first polyvinylalcohol resin of a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. between 35% and 99%, preferably between 35% and 90% preferably between 40% and 80% more preferably between 50% and 70% by weight of the first polyvinylalcohol resin of a second PVOH polymer wherein the second PVOH polymer is a homopolymer wherein the homopolymer consists of vinyl alcohol monomer units and optionally vinyl acetate monomer units.

Preferably, the first polyvinyl alcohol resin is present in a range of 50% to 95%, or from 50% to 80%, more preferably from 60% to 75%, by weight of the first water-soluble film.

Preferably, the carboxylated anionic monomer unit in the first water-soluble film is derived from a monoalkyl maleate unit preferably selected from the group consisting of monomethyl maleate, salts, preferably alkali metal salts, thereof, and combinations thereof. Without wishing to be bound by theory a polyvinyl alcohol polymer comprising carboxylated anionic monomer units, vinyl alcohol monomer units and optionally vinyl acetate monomer units is an anionic polyvinyl alcohol copolymer. Preferably each carboxylated anionic monomer unit is present in the first polyvinyl alcohol polymer in an average amount of from 3 mol. % to 6 mol. %, or from 3 mol. % to 5 mol. %, or from 3.5 mol. % to 4.5 mol. %, or from 4 mol. % to 4.5 mol. %.

Without wishing to be bound by theory, the term "homopolymer" generally includes polymers having a single type of monomeric repeating unit (e.g., a polymeric chain comprising or consisting of a single monomeric repeating unit). For the particular case of polyvinylalcohol polymer, the term "homopolymer" further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinylalcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinylalcohol polymer, the term "copolymer" (or "polyvinylalcohol copolymer") can include copolymers having a distribution of vinyl alcohol monomer units and vinyl acetate monomer units, depending on the degree of hydrolysis, as well as at least one other type of monomeric repeating unit (e.g., a ter- (or higher) polymeric chain comprising or consisting of vinyl alcohol monomer units, vinyl acetate monomer units, and one or more other monomer units, for example anionic monomer units). In the case of 100% hydrolysis, a polyvinylalcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). Anionic monomers may include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof.

Preferably, the first polyvinyl alcohol polymer in the first water-soluble film is characterized by:

a. An average 4% aqueous solution viscosity (deionised water) at 20° C. of from 10 mPa·s to 40 mPa·s, or from 10 mPa·s to 30 mPa·s, or from 12 mPa·s to 25 mPa·s, or from 14 mPa·s to 20 mPa·s, or b. An average degree of hydrolysis of 60% to 99%, preferably from 80% to 98%, preferably from 83% to 95%, preferably from 85% to 92%, or c. a mixture thereof.

Preferably, the second polyvinyl alcohol polymer in the first water-soluble is characterized by;

a. An average 4% aqueous solution viscosity (deionised water) at 20° C. from 3 mPa·s to 30 mPa·s, or from 7 mPa·s to 30 mPa·s, or from 10 mPa·s to 30 mPa·s, or from 12 mPa·s to 25 mPa·s; or b. An average degree of hydrolysis of from 60% to 99%, preferably from 80% to 98%, preferably from 85% to 95%, preferably from 87% to 92%; or c. a mixture thereof.

The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions (in deionised water) at 20 ° C.

Preferably, in the first water-soluble film, the relative weight ratio of the first PVOH polymer and second PVOH polymer is between 90/10 and 10/90, preferably between 80/20 and 20/80, more preferably between 70/30 and 50/50.

The water-soluble films, including the first, second, and optional third water-soluble films can be characterized by or tested for tensile stress according to the Modulus (MOD) Test as follows. The procedure includes the determination of modulus at 10% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. One inch wide (2.54 cm) samples of a single film sheet having a thickness of 75 µm are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 100% modulus (i.e., stress required to achieve 100% film elongation).

The first water-soluble film can be characterized by 100% modulus value of at least about 20 N/mm$^2$ as measured by the MOD Test at 35% RH. Generally, higher MOD values are desirable because they correspond to pouches having a greater stiffness and a lower likelihood of deforming and sticking to each other when loaded on top of each other during production or in final consumer packaging. Further, MOD values at 10% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. In various embodiments, the first water-soluble film has a MOD value of at least about 20, 21, 22, 23, 24, 25, or 27 N/mm$^2$ and/or up to about 24, 25, 27, 28, 29, or 30 N/mm$^2$ (e.g., about 20 N/mm$^2$ to about 30 N/mm$^2$, or about 20 N/mm$^2$ to about 28 N/mm$^2$, or about 22 N/mm$^2$ to about 25 N/mm$^2$).

Preferably, the first water-soluble film comprises between 0.1% to 3.5%, or 0.1% to 2.5%, or in a range of 1% to 2%, or in a range of 0.5% to 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably, the first water-soluble film has a residual moisture content of at least 4%, more preferably in a range of from 4% to 15%, even more preferably of from 5% to 10% by weight of the first water-soluble film as measured by Karl Fischer titration.

Preferably, the first water-soluble film comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

Preferably, the first water-soluble film comprises one or more plasticizers in an amount in a range of between 5% and 50%, preferably between 10% and 40%, most preferably between 20% and 30% by weight of the first water-soluble film. Preferably the plasticiser in the first water-soluble film is selected from polyols, sugar alcohols, or a mixture thereof, preferably wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof. Most preferably the plasticizer is selected from the group consisting of sorbitol, glycerol, dipropyleneglycol, polyethyleneglycol, trimethylolpropane, and mixtures thereof.

Preferably the first water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the first water-soluble film is in a range of from 0.02% to 1.5%, preferably from 0.1% to 1% by weight of the first water-soluble film.

Preferably, the first water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the first water-soluble film is in a range of from 0.1% to 25%, preferably from 1% to 10%, more preferably from 2% to 8%, most preferably from 3% to 5% by weight of the first water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the first water-soluble film.

The first water-soluble film may comprise a printed area. The area of print may be achieved using standard techniques, such as flexographic printing or inkjet printing.

The first water-soluble film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the first water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Second Water-Soluble Film

The water-soluble unit dose article comprises a second water-soluble film. The second water-soluble film has a first side and a second side. The second water-soluble film comprises a second polyvinyl alcohol resin.

The second water-soluble film of the present invention is soluble or dispersible in water. The second water-soluble film preferably has an average thickness prior to deformation of from 20 to 150 micron, preferably 35 to 125 micron, even more preferably 50 to 110 micron, most preferably about 76 micron.

Preferably, the second water-soluble film has a water-solubility of at least 50%, preferably at least 75% or even at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The second water-soluble film material may be obtained by casting, blow-moulding, extrusion or blown extrusion of the polymeric material, as known in the art, preferably the second water-soluble film is a solvent casted water-soluble film.

The second water-soluble film comprises a polyvinyl alcohol resin. The polyvinyl alcohol resin may be present between 50% and 95%, preferably between 50% and 80%, more preferably between 60% and 75% by weight of the second water soluble film.

The second polyvinyl alcohol resin comprises less than 15% by weight of the second polyvinyl alcohol resin of a polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof. Without wishing to be bound by theory a polyvinyl alcohol polymer comprising carboxylated anionic monomer units, vinyl alcohol monomer units and optionally vinyl acetate monomer units is an anionic polyvinyl alcohol copolymer. The second polyvinyl alcohol resin also comprises from 85% to 100% by weight of the second polyvinyl alcohol resin of a polyvinyl alcohol homopolymer or a polyvinyl alcohol homopolymer blend, wherein the polyvinyl alcohol homopolymers consist of vinyl alcohol monomer units and optionally vinyl acetate monomer units.

The present invention comprises a second water-soluble film, wherein the second water-soluble film comprises a second polyvinyl alcohol resin wherein the second polyvinyl alcohol resin comprises less than 15% by weight of the second polyvinyl alcohol resin of a polyvinyl alcohol polymer comprising a carboxylated anionic monomer unit derived from a monoalkyl maleate unit preferably selected from the group consisting of monomethyl maleate, salts, preferably alkali metal salts, thereof, and combinations thereof. If present, preferably, the carboxylated anionic monomer unit is present in the polyvinyl alcohol polymer comprising a carboxylated anionic monomer unit in an average amount of at least 3 mol. %, or from 3 mol. % to 6 mol. %, or from 3 mol. % to 5 mol. %, or from 3.5 mol. % to 4.5 mol. %, or from 4 mol. % to 4.5 mol. %. The polyvinyl alcohol polymer comprising carboxylated anionic monomer units, vinyl alcohol monomer units and optionally vinyl acetate monomer units in the polyvinyl alcohol resin of the second water-soluble film, if present, is preferably characterized by an average 4% aqueous solution viscosity (deionised water) at 20° C. of from 10 mPa·s to 40 mPa·s, or from 10 mPa·s to 30 mPa·s, or from 12 mPa·s to 25 mPas, or from 14 mPa·s to 20 mPa·s, or an average degree of hydrolysis of 60% to 99%, preferably from 80% to 98%, preferably from 83% to 95%, preferably from 85% to 92%, or a mixture thereof.

Preferably, the carboxylated anionic unit is derived from maleic acid, monoalkyl maleate, dialkyl maleate, monomethyl maleate, dimethyl maleate, maleic anhydride, or mixtures thereof, more preferably the maleate unit is derived from a monoalkyl maleate unit preferably selected from the group consisting of monomethyl maleate, salts, preferably alkali metal salts, thereof, and combinations thereof.

The second polyvinyl alcohol resin also comprises from 85% to 100% by weight of the polyvinyl alcohol resin of a polyvinyl alcohol homopolymer or a polyvinyl alcohol homopolymer blend, wherein the polyvinyl alcohol homopolymers consist of vinyl alcohol monomer units and optionally vinyl acetate monomer units. More preferably the second water-soluble film comprises a polyvinyl alcohol resin comprising between 90% and 100%, more preferably 100% by weight of the polyvinyl alcohol resin of a polyvinyl alcohol homopolymer or a polyvinyl alcohol homopolymer blend.

Most preferably, the polyvinyl alcohol resin of the second water-soluble film comprises a blend of a first polyvinylalcohol homopolymer and a second polyvinylalcohol homopolymer, the blend of the first and second polyvinyl alcohol homopolymers having an average viscosity of 8 mPa·s or more but less than 12 mPa·s, preferably 10 mPa·s or more and less than 12 mPa·s, measured as a 4% polyvinyl alcohol solution in deionised water at 20 degrees C., preferably, wherein the first polyvinyl alcohol homopolymer and second polyvinyl alcohol homopolymer are present in a relative weight ratio of 90/10 to 10/90, preferably 80/20 to 20/80, more preferably 70/30 to 50/50. Herein, the first polyvinylalcohol homopolymer preferably has an average viscosity in a range of between 11 mPa·s and 20 mPa·s, preferably between 11 mPa·s and 15 mPa·s, measured as a 4% polyvinyl alcohol polymer solution in deionised water at 20 degrees C.; and the second polyvinylalcohol homopolymer has an average viscosity in a range of between 1 mPa·s and 10 mPa·s, preferably between 5 mPa·s and 10 mPa·s, measured as a 4% polyvinyl alcohol polymer solution in deionised water at 20 degrees C.; more preferably, wherein the delta average viscosity between the first and the second polyvinyl alcohol homopolymer is at least 1 mPa·s, preferably between 2 and 10 mPa·s, more preferably between 3 and 8 mPa·s, measured as a 4% polyvinyl alcohol polymer solution in deionised water at 20 degrees C. More preferably the first and the second polyvinyl alcohol homopolymers independently have an average degree of hydrolysis in a range of between 75% and 99%, preferably between 80% and 95%, most preferably between 85% and 95%. Most preferably the polyvinyl alcohol resin of the second water soluble film has an average degree of hydrolysis in a range of between 75% and 99%, preferably between 80% and 95%, most preferably between 85% and 95%. A suitable test method to measure the degree of hydrolysis is as according to standard method JIS K6726.

The second water-soluble film can be characterized 100% modulus values of less than 20 N/mm$^2$ as measured by the MOD Test at 35% RH. Generally, higher MOD (e.g. 20 N/mm$^2$ or greater) values are desirable because they correspond to films having a greater stiffness and a lower likelihood of deforming and sticking to each other when loaded on top of each other during production or in final consumer packaging. Further, MOD values at 100% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. However, it was determined that the second polyvinyl alcohol film can advantageously have a lower 100% modulus as described herein. Furthermore, when used as a middle film in a superposed pouch configuration as described herein, a relatively lower MOD value and the resultant tendency of a film to droop is negated by the configuration of the pouch, wherein the second film is essentially wholly within the pouch product. The second water-soluble film can have a MOD value of less than about 20N/mm$^2$, or less than about 19N/mm$^2$, or less than about 18N/mm$^2$, or less than about 17N/mm$^2$, or less than about 16N/mm$^2$, or less than about 15N/mm$^2$, or less than about 14N/mm$^2$, and optionally at least about 9N/mm$^2$, or at least about 10N/mm$^2$, or at least about 11N/mm$^2$, at least about 12N/mm$^2$, or at least about 13N/mm$^2$, for example in a range of about 10N/mm$^2$ to about 16N/mm$^2$, or about 11N/mm$^2$ to about 15N/mm$^2$, or about 12N/mm$^2$ to about 14N/mm$^2$. In a related aspect, the second water-soluble film can be characterized by having a 100% modulus value that is at least about 1N/mm$^2$, or at least about 2N/mm$^2$, or at least about 3N/mm$^2$, or at least about 4N/mm$^2$, or at least about 5N/mm$^2$, or at least about 6N/mm$^2$, or at least about 7N/mm², or at least about 10N/mm², or at least about 20N/mm², or at least about 25N/mm² different from the 100% modulus value of the first water-soluble film, and further optionally at least about 1N/mm², or at least about 2N/mm², or at least about 3N/mm², or at least about 4N/mm², or at least about 5N/mm², or at least about 6N/mm², or at least about 7N/mm², or at least about 10N/mm², or at least about 20N/mm² different from the 100% modulus value of the optional third water-soluble film, and still further optionally at least about 1N/mm², or at least about 2N/mm², or at least about 3N/mm², or at least about 4N/mm², or at least about 5N/mm², or at least about 6N/mm², or at least about 7N/mm², or at least about 10N/mm², or at least about 20N/mm² different from the 100% modulus value of both the values of the first water-soluble film and the optional third water-soluble film, respectively.

The second polyvinyl alcohol resin has an average viscosity of 8 mPa·s or more but less than 12 mPa·s, preferably 10 mPa·s or more and less than 12 mPa·s, measured as a 4% polyvinyl alcohol solution in deionised water at 20 degrees C. The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions (deionised water) at 20° C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight.

Preferably, the second water-soluble film comprises between 0.1% to 3.5%, or 0.1% to 2.5%, or in a range of 1% to 2%, or in a range of 0.5% to 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably, the second water-soluble film has a residual moisture content of at least 4%, more preferably in a range of from 4% to 15%, even more preferably of from 5% to 10% by weight of the second water-soluble film as measured by Karl Fischer titration.

Preferably, the second water-soluble film comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

Preferably, the second water-soluble film comprises one or more plasticizers in an amount in a range of between 5% and 50%, preferably between 10% and 40%, most preferably between 20% and 30% by weight of the second water-soluble film. Preferably the plasticiser in the second water-soluble film is selected from polyols, sugar alcohols, or a mixture thereof, preferably wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof. Most preferably the plasticizer is selected from the group consisting of sorbitol, glycerol, dipropyleneglycol, polyethyleneglycol, trimethylolpropane, and mixtures thereof.

Preferably the second water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the second water-soluble film is in a range of from 0.02% to 1.5%, preferably from 0.1% to 1% by weight of the second water-soluble film.

Preferably, the second water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the second water-soluble film is in a range of from 0.1% to 25%, preferably from 1% to 10%, more preferably from 2% to 8%, most preferably from 3% to 5% by weight of the second water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the second water-soluble film.

The second water-soluble film may comprise a printed area. The area of print may be achieved using standard techniques, such as flexographic printing or inkjet printing.

The second water-soluble film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the second water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Optional Third Water-Soluble Film

The water-soluble unit dose article optionally comprises a third water-soluble film. The third water-soluble film of the present invention is soluble or dispersible in water. The third water-soluble film preferably has a thickness prior to deformation of from 20 to 150 micron, preferably 35 to 125 micron, even more preferably 50 to 110 micron, most preferably about 76 micron. The third water-soluble film has a first side and a second side.

Preferably, the third water-soluble film has a water-solubility of at least 50%, preferably at least 75% or even at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The third water-soluble film material may be obtained by casting, blow-moulding, extrusion or blown extrusion of the polymeric material, as known in the art, preferably the third water-soluble film is a solvent casted water-soluble film.

The third water soluble film comprises a third polyvinyl alcohol (PVOH) resin wherein the third polyvinyl alcohol resin comprises;

i. a first polyvinyl alcohol polymer comprising carboxylated anionic monomer units, vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;

ii. a second PVOH polymer wherein the second PVOH polymer is a PVOH homopolymer wherein the PVOH homopolymer consists of vinyl alcohol monomer units and optionally vinyl acetate monomer units.

Preferably, the third polyvinyl alcohol resin is present in a range of 50% to 95%, or from 50% to 80%, more preferably from 60% to 75%, by weight of the third water-soluble film.

Preferably, the carboxylated anionic monomer unit in the third water-soluble film is derived from a monoalkyl maleate unit selected from the group consisting of monomethyl maleate, salts, preferably alkali metal salts, thereof, and combinations thereof. Preferably each carboxylated anionic monomer unit is present in the first polyvinyl alcohol polymer of the third polyvinyl alcohol resin in an average amount of from 3 mol. % to 6 mol. %, or from 3 mol. % to 5 mol. %, or from 3.5 mol. % to 4.5 mol. %, or from 4 mol. % to 4.5 mol. %.

Preferably, the first polyvinyl alcohol polymer in the third water-soluble film is characterized by;

a. An average 4% aqueous solution viscosity (deionised water) at 20° C. of from 10 mPa·s to 40 mPa·s, or from 10 mPa·s to 30 mPa·s, or from 12 mPa·s to 25 mPa·s, or from 14 mPa·s to 20 mPa·s, or b. An average degree of hydrolysis of 60% to 99%, preferably from 80% to 98%, preferably from 83% to 95%, preferably from 85% to 92%, or c. a mixture thereof.

Preferably, the second polyvinyl alcohol polymer in the third water-soluble film is characterized by;

a. An average 4% aqueous solution viscosity (deionised water) at 20° C. from 3 mPa·s to 30 mPa·s, or from 7 mPa·s to 30 mPa·s, or from 10 mPa·s to 30 mPa·s, or from 12 mPa·s to 25 mPa·s; or b. An average degree of hydrolysis of from 60% to 99%, preferably from 80% to 98%, preferably from 85% to 95%, preferably from 87% to 92%; or c. a mixture thereof.

Preferably, in the third water-soluble film, the relative weight ratio of the first PVOH polymer and second PVOH polymer is between 90/10 and 10/90, preferably between 80/20 and 20/80, more preferably between 70/30 and 50/50.

The third water-soluble film can be characterized by 100% modulus value of at least about 20 N/mm$^2$ as measured by the MOD Test at 35% RH. Generally, higher MOD values are desirable because they correspond to pouches having a greater stiffness and a lower likelihood of deforming and sticking to each other when loaded on top of each other during production or in final consumer packaging. Further, MOD values at 10% elongation correspond to the ability of the film to maintain stiffness rather than loosen and droop when in contact with liquid pouch contents. In particular, films having higher MOD values correspond to pouches that are less likely to soften and take on a loose and droopy appearance when in contact with liquid pouch contents comprising a low molecular weight polyol. In various embodiments, the third water-soluble film has a MOD value of at least about 20, 21, 22, 23, 24, 25, or 27 N/mm$^2$ and/or up to about 24, 25, 27, 28, 29, or 30 N/mm$^2$ (e.g., about 20 N/mm$^2$ to about 30 N/mm$^2$, or about 20 N/mm$^2$ to about 28 N/mm$^2$, or about 22 N/mm$^2$ to about 25 N/mm$^2$).

Preferably, the third water-soluble film comprises between 0.1% to 3.5%, or 0.1% to 2.5%, or in a range of 1% to 2%, or in a range of 0.5% to 2% by weight of the water-soluble film. Suitable surfactants can include the nonionic, cationic, anionic and zwitterionic classes. Suitable surfactants include, but are not limited to nonionics, including but not limited to polyoxyethylenated polyoxypropylene glycols, alcohol ethoxylates, alkylphenol ethoxylates, tertiary acetylenic glycols and alkanolamides; cationics, including but not limited to polyoxyethylenated amines, quaternary ammonium salts and quaternized polyoxyethylenated amines; and zwitterionics, including but not limited to amine oxides, N-alkylbetaines and sulfobetaines. For example, a nonionic surfactant can be selected from alcohol ethoxylates; a cationic surfactant can be selected from quaternary ammonium salts; and a zwitterionic surfactant can be selected from amine oxides. Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably, the third water-soluble film has a residual moisture content of at least 4%, more preferably in a range of from 4% to 15%, even more preferably of from 5% to 10% by weight of the third water-soluble film as measured by Karl Fischer titration.

Preferably, the third water-soluble film comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

Preferably, the third water-soluble film comprises one or more plasticizers in an amount in a range of between 5% and 50%, preferably between 10% and 40%, most preferably between 20% and 30% by weight of the third water-soluble film. Preferably the plasticiser in the third water-soluble film is selected from polyols, sugar alcohols, or a mixture thereof, preferably wherein the polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof, wherein sugar alcohols include sugar alcohols selected from the group consisting of isomalt, maltitol, sorbitol, xylitol, erythritol, adonitol, dulcitol, pentaerythritol and mannitol, or a mixture thereof. Most preferably the plasticizer is selected from the group consisting of sorbitol, glycerol, dipropyleneglycol, polyethyleneglycol, trimethylolpropane, and mixtures thereof.

Preferably the third water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the third water-soluble film is in a range of from 0.02% to 1.5%, preferably from 0.1% to 1% by weight of the third water-soluble film.

Preferably, the third water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the third water-soluble film is in a range of from 0.1% to 25%, preferably from 1% to 10%, more preferably from 2% to 8%, most preferably from 3% to 5% by weight of the third water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the third water-soluble film.

The third water-soluble film may comprise a printed area. The area of print may be achieved using standard techniques, such as flexographic printing or inkjet printing. The first water-soluble film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the third water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Preferably, the first water-soluble film and the third water-soluble films are the same. By 'the same', we herein mean that prior to deformation during unit dose article manufacture, the first water-soluble film and the third water-soluble films are physically and chemically identical, where 'identical' means within standard processing of making specification variations.

Method of Making the Water-Soluble Films

The water-soluble films used in the water-soluble unit-dose articles of the disclosure films can be made by any suitable method. Processes for making water-soluble films include solvent casting, blow-molding, extrusion, and blown extrusion, as generally known in the art. Processes for solvent casting are well-known in the art. For example, in the film-forming process, the resins and secondary additives are dissolved in a solvent, typically water, metered onto a surface, allowed to substantially dry (or force-dried) to form a cast film, and then the resulting cast film is removed from the casting surface. The process can be performed batch-wise, and is more efficiently performed in a continuous process.

In the formation of continuous films, it is the conventional practice to meter a solution of the resin and secondary components onto a moving casting surface, for example, a continuously moving metal drum or belt, causing the solvent to be substantially removed from the liquid, whereby a self-supporting cast film is formed, and then stripping the resulting cast film from the casting surface. The solution can optionally be metered or coated onto a carrier film, release liner, or removable backing, whereby after solvent removal, the resulting cast film or coating can be separated from the carrier film, release liner, or removable backing (for example, immediately upon drying or at a later point in time, e.g., prior to use) or remain attached to the carrier film, release liner, or removable backing. A film or coating prepared on a carrier film, release liner, or removable backing can be self-supporting or non-self-supporting.

In general, the amount of water in the metered solution of polyvinyl alcohol, additional resins, and/or secondary components for film casting is selected such that when the solution is heated to the casting temperature, the solution has the highest solids level below the viscosity inflection point. Methods of determining the amount of solids at the viscosity inflection point are known in the art. In general, the water content of the metered solution can comprise between 60 to 85% water, or 60 to 75% water to provide suitable solutions for casting at typical casting solutions. The viscosity of the casting solution can be, for example, at least about 20,000 cps at 185 ° F. (85° C.), at least 30,000 cps at 185 ° F. (85° C.), for example about 40,000 cps to about 50,000 cps at 185 ° F. (85° C.).

The solution can be cast at any suitable temperature such that the film has a temperature, for example, in a range of about 50° C. to about 105° C., during drying. Without intending to be bound by theory, it is believed that as the casting solution and film temperature decreases below about 50° C., the amount of time required to dry the film undesirably increases, and the length of the drying chamber needed to fully dry the cast solution undesirably increases. Further, without intending to be bound by theory, it is believed that as the solution and film temperature increases above about 105° C., the solvent may rapidly boil out of the film, resulting in defects in the film surface such as holes or blisters in the finished films and/or facilitate undesirable reactions between adjacent PVOH backbone chain resulting in a film having reduced solubility. In a continuous or semi-continuous casting process, the moving casting surface can have a line speed in a range of about 5 m/min to about 50 m/min. The line speed can affect the properties of the resulting film, for example, physical properties, thickness, residual moisture content and film quality. In general, as the line speed decreases, the thickness of the resulting film will increase and as the line speed increases, the thickness of the resulting film will decrease, assuming the delivery rate of solution remains constant. In general, as the line speed increases the residence time of the film in the dryer decreases, thereby requiring an increase in drying temperatures, which may result in drying defects or sticking at high enough temperatures. In contrast, as the line speed decreases, the residence time of the film in the dryer increases.

Any of the first, second, third, or additional films according to the disclosure herein can be produced by solvent casting, e.g. using a solvent band casting system. The system can include a tank for mixing and/or storing a polymer solution, having optional secondary additives, for use with a band casting machine having at least a first and a second rotating drums about which a continuous band (e.g. metal band) is tensioned to travel with the rotation of the drums. A sheeting die can apply the polymer solution from the tank to the metal band where a drying chamber, enclosing at least a portion of the metal band downline of the sheeting die, is used to remove solvent from the polymer solution as it travels in a thin sheet on the metal band. In addition, a release coating can be used to provide one or more advantages to the film and/or the process. For example, the release coating can substantially reduce or eliminate bubbles in the produced polymer film, or the release coating can improve the ease of release of the produced film from the casting surface. A roll coater release coating applicator in communication with a supply of a release coating and a portion of the band can transfer fluid release coating to the casting surface prior to application of the polymer solution to the band. A suitable solvent band casting system and related materials are further described in U.S. patent application publication No. 2006/0081176 A1, the disclosure of which is incorporated herein by reference in its entirety.

In general, the casting surface can be any suitable substrate for producing polymeric films to one of skill in the art. In embodiments, the substrate can be a casting roller or drum, a casting belt, or a combination thereof. As used herein, the substrate is used for producing a polymer film from a polymer resin or polymer resin solution. The substrate comprises a substrate surface and the substrate surface is coated with a release coating. The polymer resin solution can be cast onto a substrate while the substrate is moving, e.g. rotating. In embodiments, the substrate is a casting drum. In embodiments, the substrate is a casting belt. The substrate can comprise stainless steel, and optionally can have a stainless steel surface. The substrate can comprises stainless steel that is optionally plated, e.g. chrome plated, nickel plated, zinc plated or a combination thereof.

In general, the release coating can comprise one or more surfactants and an optional carrier, e.g. water. The release coating can comprise one or more surfactants, e.g. selected from a fluorosurfactant, a non-fluorinated anionic surfactant, a non-fluorinated zwitterionic surfactant, salts thereof, or any combination thereof. In embodiments, the anionic or zwitterionic surfactant(s) can be non-fluorinated and comprise a $C_6$-$C_{30}$ phosphate ester, a $C_6$-$C_{30}$ phosphate diester, a $C_6$-$C_{30}$ carboxylate, a $C_6$-$C_{30}$ dicarboxylate, a $C_6$-$C_{30}$ sulfate, a $C_6$-$C_{30}$ disulfate, or salts thereof. In embodiments, the release coating comprises a non-fluorinated zwitterionic surfactant or salts thereof. In embodiments, the release coating comprises a non-fluorinated anionic surfactant or salts thereof. In embodiments, the non-fluorinated anionic surfactant comprises a $C_6$-$C_{30}$ phosphate ester, or a $C_8$-$C_{16}$ phosphate ester, $C_6$-$C_{60}$ phosphate diester, $C_{16}$-$C_{32}$ phosphate diester, a $C_6$-$C_{30}$ carboxylate, a $C_6$-$C_{30}$ dicarboxylate, a $C_6$-$C_{30}$ sulfate, a $C_6$-$C_{30}$ disulfate, or salts thereof. In embodiments, the non-fluorinated anionic surfactant comprises a $C_6$-$C_{30}$ phosphate ester, or a $C_6$-$C_{18}$ phosphate ester, $C_6$-$C_{60}$ phosphate diester, $C_{18}$-$C_{32}$ phosphate diester, or salts thereof. In embodiments, the anionic surfactant can be selected from one or more of a $C_6$-based ammonium fluoroaliphatic phosphate ester; tridecyl alcohol ethoxylate phosphate ester, POE-12; tridecyl alcohol ethoxylate phosphate ester, POE-3; laureth-11 carboxylic acid; crypto-anionic surfactant-laureth-6 carboxylic acid; or sodium lauryl ether sulfate, POE-4.

As used herein, the term "non-fluorinated" refers to a surfactant that has less than 0.01 wt % fluorine based on the total molecular weight of the compound, or less than 0.001 wt % fluorine based on the total molecular weight of the compound, or less than 0.0001 wt % fluorine based on the total molecular weight of the compound.

In embodiments, the release coating can include a fluorosurfactant, e.g. a perfluoroalkyl-containing compound. In embodiments, the fluorosurfactant can include a solution of ZONYL FSP surfactant (E.I. du Pont de Nemours and Company). A range of from about 0.05% by weight to about 5.0% by weight of surfactant in the release coating is contemplated. The amount of surfactant required to provide adequate wetting can vary depending on the film being coated on the band. Other products may require higher concentrations to improve release properties. Hard surface spreading wetting will be more efficient with higher surfactant concentrations until the surfactant solution reaches the critical micelle concentration (CMC). This concentration represents a threshold beyond which additional surfactant will not produce any further efficiency in spreading wetting. However, increasing the concentration beyond the CMC may improve wetting by the polymer solution and improve the release properties of some film formulations.

The release coating can be applied to the surface of a substrate and optionally subsequently dried prior to casting a polymer resin or polymer resin solution onto the surface coated substrate. In embodiments, the release coating can have a pH of about 1 to about 5 when applied to the surface of the substrate, prior to drying the release coating on the surface of the substrate. In embodiments wherein the surfactant comprises a non-fluorinated anionic surfactant, a non-fluorinated zwitterionic surfactant, salts thereof, and a combination thereof, the release coating can have a pH of about 1 to about 8 or a pH of about 1 to about 5 when applied to the surface of the substrate, prior to drying the release coating on the surface of the substrate. For example, the release coating, when applied to the surface of the substrate, can have a pH of about 1, about 1.5, about 2, about 2.5, about 3, about 3.5, about 4, about 5, about 6, about 7, or about 8. In embodiments, the release coating can have a pH of about 1 to about 7, or about 1 to about 6, or about 1 to about 4, or about 1 to about 3, or about 2 to about 7, or about 2 to about 6, or about 2 to about 5, or about 2 to about 4, about 2 to about 3, or about 3 to about 7, or about 3 to about 5, or about 1.5 to about 3.5, or about 4 to about 7 when applied to the surface of the substrate, prior to drying the release coating on the surface of the substrate.

In general, the release coating can have a surfactant concentration in a range of about 0.001 wt % to about 100 wt %, based on the total weight of the release coating. In embodiments, the release coating can have a surfactant concentration in a range of about 0.001 wt % to about 20 wt % prior to drying the release coating on the surface of the substrate. For example, the release coating can have a surfactant concentration in a range of about 0.001 wt % to about 10 wt %, or about 0.01 wt % to about 5 wt %, or about 0.01 wt % to about 4 wt %, or about 0.01 wt % to about 3 wt %, or about 0.01 wt % to about 2 wt %, or about 0.05 wt % to about 2 wt %, or about 0.1 wt % to about 2 wt %, or about 0.5 wt % to about 2 wt %, prior to drying the release coating on the surface of the substrate. In embodiments, the release coating can have a surfactant concentration in a range of about 0.01 wt % to about 4.00 wt %, based on the total weight of the release coating prior to drying the release coating on the surface of the substrate. In embodiments, the release coating can have a surfactant concentration in a range of about 0.05 wt % to about 2.00 wt %, based on the total weight of the release coating prior to drying the release coating on the surface of the substrate. In embodiments, the release coating can have a surfactant concentration in a range of about 2.5 wt % to about 100 wt %, based on the total weight of the release coating, after drying the release coating on the surface of the substrate. For example, after drying the release coating on the surface of the substrate, the release coating can have a surfactant concentration in a range of about 3 wt % to about 100 wt %, or about 4 wt % to about 90 wt %, or about 4 wt % to about 80 wt %, or about 4 wt % to about 70 wt %, or about 4 wt % to about 50 wt %, or about 4 wt % to about 30 wt %, or about 4 wt % to about 20 wt %, or about 4.7 wt % to about 100 wt %, or about 5 wt % to about 90 wt %, based on the total weight of the release coating. In embodiments, the release coating can have a surfactant concentration in a range of about 4.7 wt % to about 100 wt %, based on the total weight of the release coating, after drying the release coating on the surface of the substrate. For example, the release coating can include an amount of ZONYL surfactant in a range of about 0.05% by weight to about 5.0% by weight, based on the total weight of the release coating.

In general, the release coating as described herein can have a hydrophilic-lipophilic balance in a range of about 1 to about 30. In embodiments, the release coating can have a hydrophilic-lipophilic balance in a range of about 1 to about 20, or about 1 to about 18, or about 1 to about 17, or about 1 to about 16, or about 1 to about 15, or about 2 to about 17, or about 3 to about 17, or about 4 to about 15, or about 5 to about 12, or about 8 to about 12. In embodiments, the release coating can have a hydrophilic-lipophilic balance in a range of about 1 to about 20. In embodiments, the release coating can have a hydrophilic-lipophilic balance in a range of about 3 to about 17.

In general, the release coating has a thickness of about 0.1 nm to about 100 nm on the surface of the substrate. In embodiments, the release coating has a thickness of about 0.1 nm to about 80 nm, or about 0.1 nm to about 60 nm, or about 0.1 nm to about 40 nm, or about 0.1 nm to about 40 nm, or about 0.1 nm to about 20 nm, or about 0.1 nm to about 10 nm, or about 1 nm to about 10 nm, or about 1 nm to about 5 nm, on the surface of the substrate. In embodiments, the release coating has a thickness of about 0.1 nm to about 40 nm on the surface of the substrate. In embodiments, the release coating has a thickness of about 0.1 nm to about 10 nm on the surface of the substrate.

The Household Care Composition

The water-soluble unit dose article comprises a household care composition.

The household care composition is preferably selected from the group consisting of light duty liquid detergents compositions, heavy duty liquid detergent compositions, hard surface cleaning compositions, laundry detergent gels, bleaching compositions, laundry additives, fabric enhancer compositions, shampoos, body washes, other personal care compositions, and mixtures thereof, preferably a liquid laundry detergent composition.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

The liquid detergent composition can be used in a fabric hand wash operation or may be used in an automatic machine fabric wash operation.

Preferably, the liquid laundry detergent composition comprises from 15% to 55% by weight of the laundry detergent composition of a non-soap anionic surfactant. Preferably, the detergent composition comprises between 20% and 55%, more preferably between 25% and 50% of a non-soap anionic surfactant.

Preferably, the non-soap anionic surfactant comprises linear alkylbenzene sulphonate.

Preferably, the linear alkylbenzene sulphonate comprises $C_{10}$-$C_{16}$ alkyl benzene sulfonate, $C_{11}$-$C_{14}$ alkyl benzene sulphonate or a mixture thereof. Preferably, the alkylbenzene sulphonate is an amine neutralized alkylbenzene sulphonate, an alkali metal neutralized alkylbenzene sulphonate or a mixture thereof. The amine is preferably selected from monoethanolamine, triethanolamine or mixtures thereof. The alkali metal is preferably selected from sodium, potassium, magnesium or a mixture thereof. Preferably, the liquid laundry detergent composition comprises between 1% and 40%, preferably between 3% and 40%, more preferably between 6% and 35% by weight of the liquid laundry detergent composition of the linear alkylbenzene sulphonate.

Preferably, the non-soap anionic surfactant comprises an alkyl sulphate anionic surfactant wherein the alkyl sulphate anionic surfactant is selected from alkyl sulphate, an alkoxylated alkyl sulphate or a mixture thereof. The alkyl sulphate anionic surfactant may be a primary or a secondary alkyl sulphate anionic surfactant, or a mixture thereof, preferably a primary alkyl sulphate anionic surfactant. Preferably, the alkoxylated alkyl sulphate comprises ethoxylated alkyl sulphate, propoxylated alkyl sulphate, a mixed ethoxylated/propoxylated alkyl sulphate, or a mixture thereof, more preferably an ethoxylated alkyl sulphate. Preferably, the ethoxylated alkyl sulphate has an average degree of ethoxylation of between 0.1 to 5, preferably between 0.5 and 3. Preferably, the ethoxylated alkyl sulphate has an average alkyl chain length of between 8 and 18, more preferably between 10 and 16, most preferably between 12 and 15. Preferably, the alkyl chain of the alkyl sulphate anionic surfactant is linear, branched or a mixture thereof. Preferably, the branched alkyl sulphate anionic surfactant is a branched primary alkyl sulphate, a branched secondary alkyl sulphate, or a mixture thereof, preferably a branched primary alkyl sulphate, wherein the branching preferably is in the 2-position, or alternatively might be present further down the alkyl chain, or could be multi-branched with branches spread over the alkyl chain. The weight average degree of branching of alkyl sulphate anionic surfactant may be from 0% to 100% preferably from 0% to 95%, more preferably from 0% to 60%, most preferably from 0% to 20%. Alternatively, the weight average degree of branching of alkyl sulphate anionic surfactant may be from 70% to 100%, preferably from 80% to 90%. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, Fischer-Tropsch-synthesized material, iso-alkyl synthesized material, or mixtures thereof, preferably oxo-synthesized material. Preferably, the liquid laundry detergent composition comprises between 1% and 35%, preferably between 3% and 30%, more preferably between 6% and 20% by weight of the liquid laundry detergent composition of the alkyl sulphate anionic surfactant.

Preferably, the non-soap anionic surfactant comprises linear alkyl benzene sulphonate and an alkoxylated alkyl sulphate, more preferably, wherein the weight ratio of linear alkylbenzene sulphonate to alkoxylated alkyl sulphate is from 1:2 to 9:1, preferably from 1:1 to 7:1, more preferably from 1:1 to 5:1, most preferably from 1:1 to 4:1.

The liquid laundry detergent composition comprises from 2.5% to 30% by weight of the liquid laundry detergent composition of a non-ionic surfactant. The non-ionic surfactant is described in more detail below.

Preferably, the weight ratio of non-soap anionic surfactant to non-ionic surfactant is from 1:1 to 13:1, preferably from 1.25:1 to 10:1, more preferably from 1.5:1 to 7.5:1.

Preferably, the liquid laundry detergent composition comprises a non-ionic surfactant. Preferably, the non-ionic surfactant comprises an alkoxylated alcohol, wherein the alkoxylated alcohol is derived from a synthetical alcohol, a natural alcohol or a mixture thereof. The alkoxylated alcohol can be a primary alkoxylated alcohol, a secondary alkoxylated alcohol, or a mixture thereof, preferably a primary alkoxylated alcohol. Preferably, the alkoxylated alcohol comprises ethoxylated alcohol, propoxylated alcohol, a mixed ethoxylated/propoxylated alcohol, or a mixture thereof, more preferably an ethoxylated alcohol. Alternatively, the alkoxylated alcohol might also include higher alkoxy groups such as butoxy groups. When mixed alkoxy groups, the alkoxy groups can be randomnly ordered or present in blocks, preferably are present in blocks. For example, mixed ethoxy (EO)/propoxy (PO) groups might be ordered in EO/PO blocks, PO/EO blocks, EO/PO/EO blocks or PO/EO/PO blocks. Preferably, the ethoxylated alcohol has an average degree of ethoxylation of between 0.1 to 20, preferably between 5 and 15, most preferably between 6 and 10. If propoxylation is present, preferably the average degree of propoxylation is between 0.1 to 25, more preferably between 2 and 20, most preferably between 5 and 10. Preferably, the alkoxylated preferably ethoxylated alcohol has an average alkyl chain length of between 8 and 18, more preferably between 10 and 16, most preferably 12 and 15. Preferably, the alkyl chain of the alkoxylated alcohol is linear, branched or a mixture thereof, wherein the branched alkyloxylated alcohol is a branched primary alkoxylated alcohol, a branched secondary alkoxylated alcohol, or a mixture thereof, preferably a branched primary alkoxylated alcohol. Preferably, the weight average degree of branching of the alkoxylated alcohol is from 0% to 100% preferably from 0% to 95%, more preferably 0% to 60%, most preferably from 0% to 20%. The branching can be on the 2-alkyl position, or alternatively further down the alkyl chain, or can be multi-branched with individual branches spread over the alkyl chain. Preferably, the synthetically derived material comprises oxo-synthesized material, Ziegler-synthesized material, Guerbet-synthesized material, Fischer-Tropsch-synthesized material, iso-alkyl branched materials, or mixtures thereof, preferably oxo-synthesised material. Preferably, the liquid laundry detergent composition comprises between 0.5% and 20%, preferably between 1% and 15%, more preferably between 3% and 12% by weight of the liquid laundry detergent composition of the non-ionic surfactant, preferably wherein the nonionic surfactant consists of the alkoxylated alcohol. Without wishing to be bound by theory, non-ionic surfactants, especially alkoxylated alcohol non-ionic surfactants provide the benefit of excellent body soil cleaning and soil suspension.

Preferably, the weight ratio of non-soap anionic surfactant to nonionic is from 1:1 to 20:1, from 1.5:1 to 17.5:1, from 2:1 to 15:1, or from 2.5:1 to 13:1.

Preferably, the liquid laundry detergent composition comprises a fatty acid, preferably a neutralized fatty acid soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine. The liquid detergent composition may comprise between 1.5% and 20%, between 2% and 15%, between 3% and 12%, or between 4% and 10% by weight of the liquid detergent composition of fatty acid.

Preferably, the liquid laundry detergent composition comprises between 1% and 20%, preferably between 5% and 15% by weight of the liquid laundry detergent composition of water. Preferably, the liquid laundry detergent composition comprises between 10% and 40%, preferably between 15% and 30% by weight of the liquid laundry detergent composition of a non-aqueous solvent, preferably wherein the non-aqueous solvent is selected from 1,2-propanediol, dipropylene glycol, tripropyleneglycol, glycerol, sorbitol, polyethylene glycol or a mixture thereof.

Preferably, the liquid laundry detergent composition comprises an adjunct ingredient selected from the group comprising builders, perfumes, enzymes, citrate, bleach, bleach catalyst, dye, hueing dye, brightener, cleaning polymers including alkoxylated polyamines and polyethyleneimines, soil release polymer, fabric care polymers including cationic hydroxyethyl celluloses and cationic polyglucans, surfactant, solvent, dye transfer inhibitors, chelant, encapsulated perfume, polycarboxylates, structurant, pH trimming agents, anti-oxidants including Ralox 35, and mixtures thereof.

Preferably, the laundry detergent composition comprises a further enzyme selected from the group comprising hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, xyloglucanases, mannanases and amylases, nuclease or mixtures thereof, preferably a further enzyme selected from the group comprising proteases, amylase, cellulase, lipases, xyloglucanases, mannanases, and mixtures thereof. Preferably the further enzyme is a lipase.

The term lipase as used herein, includes enzymes which catalyze the hydrolysis of fats (lipids). Lipases are a sub class of esterases. Lipases suitable in the present invention include phospholipases, acyltransferases or perhydrolases e.g. acyltransferases with homology to *Candida antarctica* lipase A, acyltransferase from *Mycobacterium smegmatis*, perhydrolases from the CE 7 family, and variants of the *M. smegmatis* perhydrolase in particular the S54V variant used in the commercial product Gentle Power Bleach from Huntsman Textile Effects Pte Ltd. Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*), cutinase from *Humicola*, e.g. *H. insolens*, lipase from strains of *Pseudomonas* (some of these now renamed to *Burkholderia*), e.g. *P. alcaligenes* or *P. pseudoalcaligenes, P. cepacia, P.* sp. strain SD705, *P. wisconsinensis,* GDSL-type *Streptomyces* lipases, cutinase from *Magnaporthe grisea*, cutinase from *Pseudomonas mendocina,* lipase from *Thermobifida fusca, Geobacillus stearothermophilus* lipase, lipase from *Bacillus subtilis,* and lipase from *Streptomyces griseus* and *S. pristinaespiralis*. Typically, the lipase enzyme is present in the composition in an amount from 0.001% to 0.03%, preferably from 0.0025% to 0.025% and more preferably from 0.005% to 0.02% by weight of the composition of enzyme active protein. Without wishing to be bound by theory, enzymes are supplied as a preparation comprising the enzyme and other ingredients. Enzymes per se are proteins that catalyse reactions. By enzyme active protein we herein mean enzyme that can actively catalyse the relevant reaction.

Preferably, the liquid laundry detergent composition has a pH between 6 and 10, more preferably between 6.5 and 8.9, most preferably between 7 and 8, wherein the pH of the laundry detergent composition is measured as a 10% product concentration in deionised water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition.

Process of Making the Water-Soluble Unit Dose Article

A further aspect of the present invention is a process of making a water-soluble unit dose article according to the present invention, comprising the steps of;
a. deforming the first water-soluble film in a mould to create an open cavity via thermoforming, vacuum forming, or a combination thereof;
b. Filling the open cavity with the household care composition;
c. Closing the open filled cavity with the second water-soluble film;
d. Sealing the first water-soluble film and the second water-soluble film to create a closed intermediate, preferably wherein the first water-soluble film and the second water-soluble films are sealed via solvent sealing, more preferably wherein a solvent sealing solution is applied to the second side of the second water-soluble film ahead of sealing the films together, wherein the second side of the second water-soluble film faces the first water-soluble film.

Alternatively, if the third water-soluble film is present, the process may comprise the steps of;
a. deforming the first water-soluble film in a mould to create an open cavity via thermoforming, vacuum forming, or a combination thereof;
b. Filling the open cavity with the household care composition;
c. Separately deforming the third water-soluble film in a mould to create at least one open cavity via thermoforming, vacuum forming, or a combination thereof;
d. Filling the at least one open cavity from step c with the household care composition;
e. Closing the open filled cavity from step c with the second water-soluble film;
f. Sealing the second water-soluble film and the third water-soluble film to create a closed intermediate, preferably wherein the second water-soluble film and the third water-soluble films are sealed via solvent sealing, more preferably wherein a solvent sealing solution is applied to the the first side of second water-soluble film ahead of sealing the films together, the first side being the side facing the third water-soluble film;
g. Closing the open filled cavity from step b with the closed intermediate from step f;
h. Sealing the first water-soluble film and the second water-soluble film to create the water-soluble unit dose article, preferably wherein the first water-soluble film and the second water-soluble film are sealed via solvent sealing, more preferably wherein a solvent sealing solution is applied to the second side of the second water-soluble film ahead of sealing the films together, the second side being the side facing the first water-soluble film.

Preferably, the first water-soluble film in step a and the second water-soluble film in step c are identical prior to deforming. By 'the same', we herein mean that prior to deformation during unit dose article manufacture, the first water-soluble film and the third water-soluble films are physically and chemically identical, where 'identical' means within standard process of making specification variations.

The process for making the water-soluble unit dose articles could be an automated manufacturing process, such as a conveyer belt, a series of conveyer belts, a drum, a series of drums or a mixture thereof. Alternatively, the process for making the water-soluble unit dose articles may be a manual manufacturing line, in which the one or more sequences or steps are conducted manually. Most preferably the process is an automated process.

Preferably, the process of making the water-soluble unit dose articles is a continuous process. Alternatively, the process of making the water-soluble unit dose articles may be an intermittent or batch process. Preferably the process of making the water-soluble unit dose articles is a continuous making process.

Preferably, the closed intermediate is made on a rotating drum or a horizontal belt, preferably on a rotating drum. Preferably, the filled open cavity in steps a and b is made on a horizontal belt or a rotating drum, preferably on a horizontal belt. Wherein a rotating drum is used, the water-soluble film is preferably maintained in place via vacuum. Wherein a horizontal belt is used, the water-soluble film is preferably maintained in place via vacuum.

Preferably, multiple unit dose articles are formed that are connected to one another by flat areas. Without wishing to be bound by theory, such a process involves making a plurality of water-soluble unit dose articles joined together by non-deformed film to create a water-soluble web of unit dose articles. The non-deformed films are the flat areas of the water-soluble web between the unit dose articles. Therefore, the flat areas may comprise two or more water-soluble films sealed together.

The resultant web of water-soluble unit dose articles connected via flat areas is consequently transferred to a cutting station and cut to produce individual unit dose articles. Preferably the cutting station cuts the web in a machine direction and cross-machine direction. Preferably cutting is achieved using rotating knives. It may be preferred that the cutting is also done in continuous manner, and preferably with constant line speed and preferably while in horizontal position. The cutting device can, for example, be a sharp item, or a hot item, or a laser, whereby in the latter cases, the hot item or laser 'burns' through the film/sealing area. The cutting can be performed by one or more rotating knives. Preferably, the cutting is performed by one or more rotating knives, wherein the rotating knives cut in a machine direction, a cross-machine direction or a mixture thereof. Preferably the rotating knives rotate at a variable rotational speed.

The solvent sealing solution can be applied by any suitable method, including contact and/or non-contact methods. For example, the solvent solution can be applied in a contact transfer process, e.g. using a contact member comprising a nonabsorbent or substantially impermeable material, e.g. using an anilox roller, rubber (e.g. EPDM) roller, or any combination thereof, optionally in combination with a doctor blade. The sealing solution can be applied using a drawdown bar, Mayer bar, or similar apparatus. In another type of embodiment the sealing solution can be applied using a contact member comprising an absorbent material, for example natural felt, synthetic felt, porous plastic, foam, sponge, microfiber, cotton, polyester, extruded polyester fibers, nonwoven webs and the like, e.g. in pad or roller form. Application of solvent sealing solution via a felt roll is particularly contemplated. The solvent sealing solution may be applied via a felt roll, a spray or dosing nozzle, or a mixture thereof, preferably via a felt roll. Preferably, the solvent sealing solution comprises an aqueous solvent, a non-aqueous solvent or a mixture thereof. Even more preferably, the solvent sealing solution comprises water. Preferably, the solvent sealing solution comprises at least 95%, or even at least 98%, or even at least 99%, or even 100% by weight of the solvent sealing solution of water. Preferably the solvent sealing solution is applied via a felt roll, via a spray or dosing nozzle, or a combination thereof, more preferably via a felt roll. Preferably, the solvent sealing solution is applied to the second water-soluble film. Preferably, the solvent sealing solution is present on the water-soluble film between 1 g and 30 g of sealing solution per square meter preferably between 5 g and 20 g of sealing solution per square meter.

The water-soluble films may be pre-heated ahead of deformation via a hot plate, an infra-red lamp, or a mixture thereof, preferably an infra-red lamp.

The moulds, in which the articles may be made, can have any shape, length, width and depth, depending on the required dimensions of the pouches. The moulds may also vary in size and shape from one to another, if desirable. For example, the volume of the final unit dose articles can be about 5 ml to about 300 ml, or about 10 ml to 150 ml, or about 20 ml to about 100 ml, and that the mould sizes are adjusted accordingly.

EXAMPLES

The impact of presence versus absence of an anionic polyvinyl alcohol copolymer, as well as the impact of varying average molecular weight, expressed as a 4% viscosity of an aqueous polymer solution (deionised water), of a polyvinyl alcohol homopolymer blend within a polyvinyl alcohol blend comprising polymer resin, has been studied on 1) the sensitivity of the corresponding water-soluble film to create a foam layer at the film surface upon sealing solvent application, 2) the resulting seal and unit dose article strength, as well as 3) the film/unit dose article dissolution profile.

Test Materials:
Water-Soluble Films:

Solvent casted water-soluble test films single variably differing on polyvinyl alcohol type selection were provided by the MonoSol company. The test films comprise 65% of a water-soluble polyvinyl alcohol resin, the remainder being water, plasticizer, surfactant, and other materials typically present inside water-soluble films. Comparative examples 1 to 4 comprise 15% to 30% by weight of the polyvinyl alcohol polymer resin of an anionic copolymer and as such are outside the scope of the invention. Comparative examples 5 to 7 comprise a polyvinyl alcohol homopolymer blend but with an average viscosity outside the scope of the invention.

Inventive example 1 comprises a polyvinyl alcohol homopolymer blend with an average viscosity according to the invention.

anionic polyvinyl alcohol copolymer comprising resins (%'s by weight of polyvinyl alcohol polymeric resin):
Comparative Example 1: polyvinyl alcohol blend comprising 70% polyvinyl alcohol homopolymer (13 mPa·s, dH 86%)—30% methyl maleate based anionic polyvinyl alcohol copolymer (4% anionic substitution, 18 mPa·s, 90% dH)
Comparative Example 2: polyvinyl alcohol blend comprising 85% polyvinyl alcohol homopolymer (13 mPa·s, dH 86%)—15% methyl maleate based anionic polyvinyl alcohol copolymer (4% anionic substitution, 18 mPa·s, 90% dH)
Comparative Example 3: polyvinyl alcohol blend comprising 85% polyvinyl alcohol homopolymer (8 mPa·s, dH 88%)—15% methyl maleate based anionic polyvinyl alcohol copolymer (4% anionic substitution, 18 mPa·s, 90% dH)
Comparative Example 4: polyvinyl alcohol blend comprising 85% polyvinyl alcohol homopolymer (18 mPa·s, dH 88%)—15% methyl maleate based anionic polyvinyl alcohol copolymer (4% anionic substitution, 18 mPa·s, 90% dH)
Resins consisting of polyvinyl alcohol homopolymer (%'s by weight of polyvinyl alcohol polymeric resin):
Comparative Example 5: 100% polyvinyl alcohol homopolymer (13 mPa·s, dH 86%)
Comparative Example 6: polyvinyl alcohol homopolymer blend comprising 80% polyvinyl alcohol homopolymer (13 mPa·s, dH 86%)—20% polyvinyl alcohol homopolymer (8 mPa·s, dH 88%)—average viscosity: 12 mPa·s
Comparative Example 7: polyvinyl alcohol homopolymer blend comprising 80% polyvinyl alcohol homopolymer (13 mPa·s, dH 86%)—20% polyvinyl alcohol homopolymer (18 mPa·s, dH 88%)—average viscosity: 14 mPa·s Inventive Example 1: polyvinyl alcohol homopolymer blend comprising 60% polyvinyl alcohol homopolymer (13 mPa·s, dH 86%)—40% polyvinyl alcohol homopolymer (8 mPa·s, dH 88%)—average viscosity: 11 mPa·s Water-Soluble Unit Dose Article:

These water-soluble test films were used to create water soluble unit dose articles. A first water-soluble film comprising a polyvinyl alcohol blend comprising 60% polyvinyl alcohol homopolymer (23 mPa·s, dH 87%) and 40% methyl maleate based anionic polyvinyl alcohol copolymer (4% anionic substitution, 18 mPa·s, 90% dH), as provided by the MonoSol company, was drawn into a mold comprising 2 side by side cavities under influence of vacuum to create open compartments. A detergent composition was dosed inside of these open compartments, followed by closing the open filled compartments with above test films. The side by side configuration represents the top compartment configuration, as displayed in FIG. 1. The 2 films were sealed together with water, the sealing water being pre-applied on the test films through a pre-wetted felt roll on the surface facing the first water-soluble film. Target sealing water coat weight was 9 gram of water per square meter of water-soluble film. A third water-soluble film of the same composition as the first water-soluble film was drawn in a separate mold comprising a single cavity under influence of vacuum in order to create an open compartment. A detergent composition was dosed inside the open compartment prior to closing the open compartment with the side-by-side compartment unit dose article created above, in order to create a water-soluble unit dose article as displayed in FIG. 1 and as sold under the Fairy NonBio brand by the Procter and Gamble company in the UK in July 2020. Herefore sealing water was pre-applied on the test films through a pre-wetted felt roll on the surface facing the third water-soluble film. Target sealing water coat weight was 13 gram of water per square meter of water-soluble film. All water soluble films used had a starting thickness prior to article creation of 76 micron.

Detergent Compositions:

The respective detergent compositions, as added into the individual compartments described in the water-soluble unit dose article section above, are summarized in Table 1. Detergent compositions were prepared through mixing of the individual components in a batch process.

TABLE 1

Detergent formulations

| 100% active | Bottom compartment | Top compartment 1 | Top compartment 2 |
|---|---|---|---|
| Neodol 24/7 ethoxylated alcohol nonionic surfactant | 3.2 | 1.8 | 1.5 |
| Linear alkylbenzene sulphonic acid | 27.6 | 21.8 | 17.7 |
| MEA-A24E3S | 7.9 | 11.5 | 8.9 |
| Citric acid | 0.7 | 0.6 | 0.5 |
| Fatty acid | 11.4 | 4.7 | 3.7 |
| Ethoxylated polyethyleneimine* | 1.6 | 1.4 | 1.1 |
| Zwitterionic polyamine ** | 1.6 | 1.6 | 1.3 |
| HEDP | 0.7 | 2.0 | 1.6 |
| Texcare SRA300 | — | 4.4 | — |
| Polyquaternium 10*** | — | — | 7.8 |
| FWA 49 | 0.3 | 0.1 | 0.1 |
| Antifoam (AF8017) | 0.3 | — | — |
| 1,2-propanediol | 15.6 | 24.1 | 23.2 |
| Glycerol | 5.3 | 7.6 | 3.3 |
| PPG (MW 400) | — | — | 12.7 |
| Monoethanolamine (pH trimming agent) | 9.6 | 9.5 | 7.3 |
| K2SO3 | 0.5 | 0.4 | 0.4 |
| MgCl2 | 0.1 | 0.3 | 0.2 |
| Water | 1.9 | 8.6 | 8.7 |
| Acusol 880 | — | — | 0.6 |
| Hydrogenated castor oil | 0.1 | 0.8 | 0.2 |
| Minors (perfume, dyes, antioxidant, . . . ) | Balance to 100% | Balance to 100% | Balance to 100% |
| pH (as 10% aqueous solution) | 7.4 | 7.4 | 7.4 |

*ethoxylated polyethyleneimine having an average degree of ethoxylation of 20 per EO chain and a polyethyleneimine backbone with MW of about 600

** Lutensit Z96: partially sulfate polyethoxylated hexamethylenediamine, as available from the BASF company

***premix composition: 37 wt % cationic hydroxyethyl cellulose, 60 wt % PPG400, 3 wt % Acusol 880-premix components reflected in above formula composition Test Results:

Presence Versus Absence of Foam Layer:

Water-soluble test films according to and outside the scope of the invention have been visually assessed for the presence versus absence of a foam layer created at the water-soluble film surface after the sealing water application step on the test film prior to contacting the third water-soluble film. The results summarized in table 2 below clearly show that water-soluble films comprising a water-soluble resin comprising 15 to 30% of an anionic copolymer (comparative examples 1 to 4) are sensitive to creating a foaming layer at the surface of the water-soluble film upon sealing water application, contrary to water-soluble films comprising a polymeric resin consisting of a polyvinyl alcohol homopolymer (blend) (inventive example 1 and comparative examples 5 to 7). This foam layer is believed to drive an inhomogeneous spreading of the sealing water, leading to an inferior seal quality behind the presence of weakly sealed spots accordingly.

TABLE 2

Presence versus absence of foam layer

| | Comparative Example 1 | Comparative Example 2 | Comparative Example 3 | Comparative Example 4 | Comparative Example 5 | Comparative Example 6 | Comparative Example 7 | Inventive Example 1 |
|---|---|---|---|---|---|---|---|---|
| Foam layer | present | present | present | present | absent | absent | absent | absent |

% Pouch Strength Pass Rate and % Seal Failure:
Test Method:

This test method describes the practice for determining the % pouch strength pass rate and % seal failure using the Mark-10 testing instrument ESM750SLCE (j.j. bos b.v., Marconistraat 1, NL-2809 PH Gouda, The Nederlands) with a load cell of maximum 100 kN (kilo Newton). Under the effect of the external compression force, the pouch deforms building stress on both the film and the seal area. The internal pressure in the pouch depends on the outside applied force on the overall pouch surface area. Pouch strength (in Newtons) is defined as the maximum compression force required by two parallel plates to increase the internal pressure of the pouch up to the point of burst. Pouches bursting at the seal area are reported as "seal failures" used in the calculation of the % Seal Failure rate (Seal Failure=1, No Seal Failure=0) across 18 replicates. Pouches bursting at a pressure equivalent to the one generated by compression with less than 300N are reported as "failures" used in the calculation of the % Pouch Strength Pass rate (Failure=0, Pass=1) across 18 replicates.

The % pouch strength pass rate and % seal failure were measured after having stored the water-soluble pouches for 7 days at ambient conditions, and pre-conditioned for 16-24 h at 23° C./50% RH. The method is performed in a room environment between 40-50% relative humidity (RH) and 22-24° C. Water-soluble pouches are tested within one hour of taking them out of the pre-conditioning.

Figure 2:
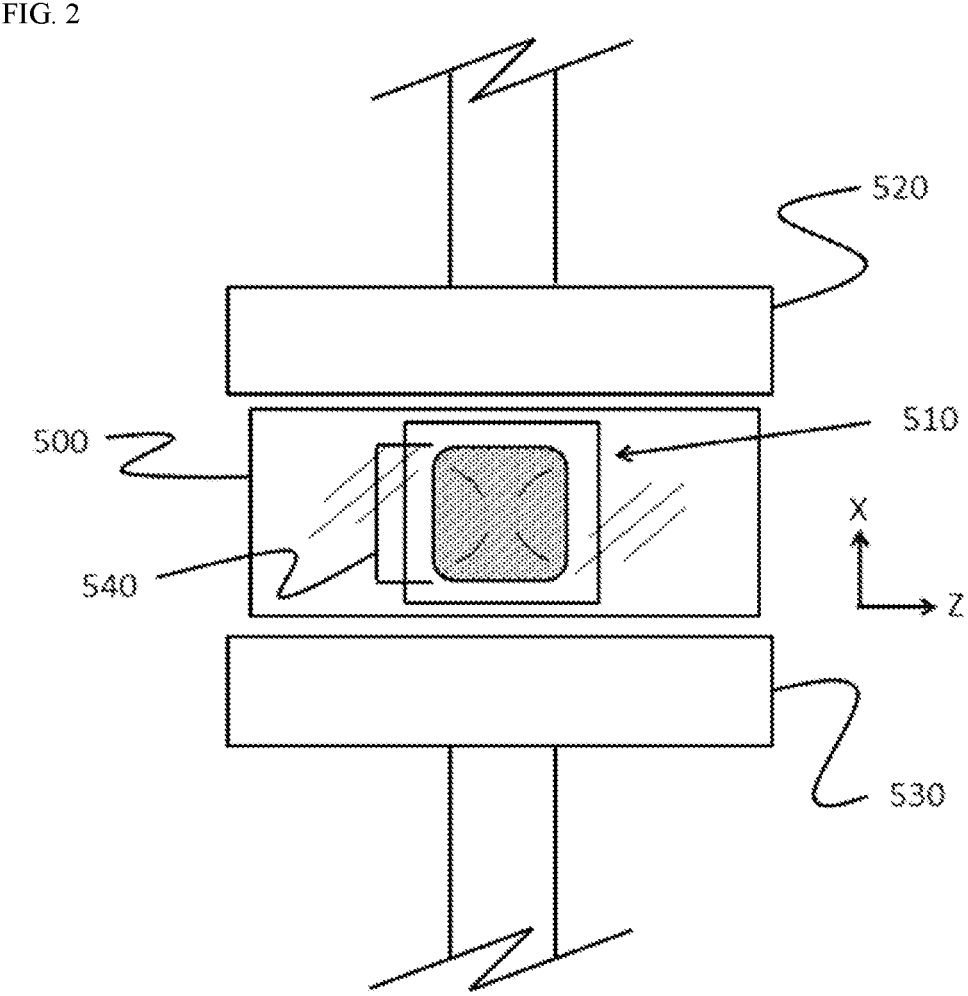
FIG. 2 shows a schematic illustration of the basic configuration of the % pouch strength pass rate and % seal failure test.

FIG. 2 shows a schematic illustration of the basic configuration of the % pouch strength pass rate and % seal failure test. To measure % pouch strength pass rate and % seal failure, a pouch 510 is enclosed in a plastic bag consequently sealed 500 (150 mm by 124 mm with closure, 60 micron thick—e.g. Raja grip RGP6B) to prevent contamination of working environment upon pouch rupture. The pouch 510 is centered in the bag, and placed between two compression plates 520, 530 of the instrument. The pouch 510 is placed in an upright position, so that the width seal dimension 540 (e.g. smallest dimension within a defined rectangular plane just encompassing the seal area, 41 mm in actual pouches tested) is between the compression plates (x-direction) such that the stress will be applied on the width seal. Herefore the diameter of the compression plates needs to be big enough in order not to pinch the pouch as it deforms (here D=116 mm). For the compression, the speed of decreasing the distance between the plates 520 and 530 is set at 200 mm/min. 18 replicates are conducted per test leg, and % pouch strength pass rate and % seal failure data across those 18 replicates are reported.

Test Results:

The results summarized in table 3 clearly show that water-soluble unit-dose articles comprising a water-soluble test film comprising a polyvinyl alcohol based polymer resin consisting of a homopolymer blend with an average viscosity profile according to the invention (Inventive Example 1) have a superior pouch strength and seal failure profile compared to water-soluble unit-dose articles comprising a water-soluble test film comprising a polyvinyl alcohol based polymer resin consisting of a homopolymer blend with an average viscosity profile outside the scope of the invention (Comparative Examples 5 to 7), as well as when compared to water-soluble unit-dose articles comprising a water-soluble test film comprising a polyvinyl alcohol based polymer resin comprising from 15% to 30% of an anionic polyvinyl alcohol copolymer (Comparative Examples 1 to 4).

TABLE 3

Pouch strength and seal failure

| | Comparative Example 1 | Comparative Example 2 | Comparative Example 3 | Comparative Example 4 | Comparative Example 5 | Comparative Example 6 | Comparative Example 7 | Inventive Example 1 |
|---|---|---|---|---|---|---|---|---|
| % Pouch Strength Pass rate* | 0 | 13 | 100 | 42 | 46 | 54 | 63 | 100 |
| % seal failure** | 100 | 96 | 4 | 75 | 67 | 63 | 63 | 0 |

*The higher the better
**The lower the better

Water-Soluble Unit Dose Article Dissolution—Film Residue
Test Method:

This test method describes a water-soluble unit dose article dissolution test, in which the amount of undissolved water-soluble film residues is assessed. More particularly, this method is designed to assess the relative dissolution properties of laundry water-soluble unit dose articles under stressed washing machine conditions. For this method Electrolux Programmable Washing machines type W565H comprising a ballast load with a mix of Cotton and Polycotton pieces (from Calderon Textiles, LLC 6131 W 80th Street Indianapolis, IN 46278) were used. Ballast loads are comprised of cotton and polycotton knit, double-ply swatches approximately 50×50 cm in size.

Orange pouches: Brand new Cotton white ballast load from Calderon 50×50cm was divided into portions of max 3.0kg (~25 items of ballast cotton) and prepared to be colored into orange through a washing-machine dying process, using commercially available dying solutions. To color the load any standard household washing machine can be used, employing a standard cotton cycle at 40° C. 350 g of the Dylon fresh orange machine dye all-in-one are added to the drum of the washing machine. Salt may be added, depending on the dye package instructions.

The drum was consequently manually moved to the left and the right until the dye were not visible anymore. 25 items of cotton ballast (size of 50 cm×50 cm), were consequently evenly distributed over the drum without folding of the items. A standard cotton cycle at 40° C. was run at a water hardness of 15 gpg. After completion of the cycle 75 g of Ariel Professional powder was added into the dispenser and a normal cotton cycle at 40° C. was run at a water hardness of 15 gpg. After completion of this cycle 2 additional normal cotton cycles at 40° C. without any detergent were run at a water hardness of 15 gpg, followed by line-drying the items.

To note: Brand new Calderon load must be desized before coloring them by adding 25 items into a front loading Miele washing machine and running 2 short cotton cycles at 60° C. (approximate duration of 1 h30) with 50 g of Ariel sensitive powder and a water hardness of 15 gpg, followed by running 2 more short cotton cycles at 60° C. (approximate duration of 1 h30) with no detergent and a water hardness of 15 gpg, followed by tumble drying.

The orange fabrics are then cut into 48×48 cm pieces, folded in half, cut in half and sawn to the sides into 4 equivalent pouches of 22×22cm with the top side open. 1 test product of a pre-conditioned water-soluble unit dose article is placed at the bottom right corner of the orange pouch, and the pouch is stitched closed. The water-soluble unit dose article must be pre-conditionned for a minimum of 2 weeks at 23° C., 50% rH before testing. Load: 4 loads of 3 kg of mixed cotton (13 pieces) and polycotton (10 pieces) were de-sized before use by washing in a short cotton cycle at 60° C. with 79g of Ariel Professional detergent at a water hardness of 15 gpg, followed by another short cotton cycle at 60° C. without any detergent at a water hardness of 15 gpg, and finally tumble-dried. Each load of 3.0 kg is pre-treated 2 times by washing with 4 Ariel pods in the "prewet" cycle, followed by a wash without detergent in the "dissolution program" described below, and finally tumble-dried.

The Electrolux W565 programmable washing machines were programmed with 2 programs. The first program was designed to equally wet the load (pre-wet program). The second program (dissolution program) was utilized to simulate 15 min of a Western Europe stressed cycle setting, followed by pumping out the water and starting a spin of 3 min at 1100 rpm.

|  |  | Pre-wet program | Dissolution program |
|---|---|---|---|
| Wash | Time | 5 min | 15 min |
|  | Motor rotation | 49 rpm | 59 rpm |
|  | Water intake | 12 L | 13.4 L |
|  | Heating | 20° C. | 20° C. |
|  | Water Hardness | 15 gpg | 15 gpg |
|  | Motor action time clockwise | 28 s | 20 s |
|  | Motor resting time | 12 s | 20 s |
|  | Motor action time Counterclockwise | 28 s | 28 s |
| Drain | Draining time | 1 min | 20 s |
|  | Motor rotation | 20 rpm | 49 rpm |
| Extraction | Time | 30 s | 3 min |
|  | Motor rotation | 900 rpm | 1100 rpm |

A load consisting of 13 pieces of 50×50 cm of cotton and 10 pieces of 27×27 cm of polycotton (weighed at 3.0 +/−0.15 kg) was evenly introduced in the Electrolux W565 washing machine and the pre-wet program was run 2 times.

After the pre-wet program, the wet ballast was taken out of the drum and 4 orange pouches containing each a different test leg water soluble unit dose article were aligned at the bottom of the drum, hence 4 different test products are tested at once in the same washing machine in order to render the testing environment as reproducible as possible across the test legs. 10 g of suds suppressor (Dowsil GP-4314 silicone suds suppressor, commercially available from the Dow Corning company) was added in the dispenser, and the wet load was placed on top of the orange pouches, without allowing the drum to move. The dissolution program was initiated. At the end of the full program, the orange pouches were transferred to a grading room (equipped with D65 lighting conditions) to be assessed for residues by expert graders.

The orange pouches are cut and graded visually, within 30 min after the end of each run, according a scale of 0 to 7 (0=No film residue, 7=Full pouch residue).The final score is calculated as the average of 4 external replicates, i.e. 4 different washing machine runs, and repeated 2 times (average of 8 scores).

Test Results:

The results summarized in table 4 clearly show that water-soluble unit-dose articles comprising a water-soluble test film comprising a polyvinyl alcohol based polymer resin consisting of a homopolymer blend with an average viscosity profile according to the invention (Inventive Example 1), despite having a superior pouch strength, do not demonstrate a dissolution compromise compared to tested water-soluble unit-dose articles comprising a water-soluble test film comprising a polyvinyl alcohol based polymer resin consisting of a polyvinyl alcohol homopolymer blend with an average viscosity profile outside the scope of the invention (Comparative Examples 5 to 6), as well as compared to tested water-soluble unit-dose articles comprising a water-soluble test film comprising a polyvinyl alcohol based polymer resin comprising 15% of an anionic polyvinyl alcohol copolymer (Comparative Examples 2 to 3).

TABLE 4

| Film residue grading | | | | | |
|---|---|---|---|---|---|
|  | Comparative Example 2 | Comparative Example 3 | Comparative Example 5 | Comparative Example 6 | Inventive Example 1 |
| Average film residue grading* | 1.44 | 1.50 | 1.91 | 1.72 | 1.38 |

*The lower the better

Overall Conclusion:

From the data summarized across the different examples it is clear that water-soluble films comprising a polyvinyl alcohol based resin consisting of a polyvinyl alcohol homopolymer blend comprising a viscosity profile according to the invention do not form a foam layer upon sealing solvent application, leading into a superior seal and pouch strength profile while not leading to a dissolution compromise, compared to comparative water-soluble film compositions outside the scope of the invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising at least a first compartment and a household care composition, wherein the household care composition is housed in the at least first compartment, wherein the unit dose article comprises:
  a. a first water-soluble film, wherein the first water-soluble film has a first side and a second side, and wherein the first water soluble film comprises a first polyvinyl alcohol (PVOH) resin wherein the first polyvinyl alcohol resin comprises:
    i. between 1% and less than about 65%, by weight of the first polyvinylalcohol resin, of a first polyvinyl alcohol polymer comprising carboxylated anionic monomer units and vinyl alcohol monomer units and optionally vinyl acetate monomer units; and wherein the carboxylated anionic monomer unit is derived from a member selected from the group consisting of maleic acid, monoalkyl maleate, dialkyl maleate, maleic anhydride, and combinations thereof;
    ii. between about 35% and about 99%, by weight of the first polyvinylalcohol resin of a second PVOH polymer wherein the second PVOH polymer is a homopolymer wherein the homopolymer consists of vinyl alcohol monomer units and optionally yinyl acetate monomer units;
  b. a second water-soluble film, wherein the second water-soluble film has a first side and a second side, and wherein the second water-soluble film comprises a second polyvinyl alcohol resin wherein the second polyvinyl alcohol resin comprises:
    i. less than about 15% by weight of the second polyvinyl alcohol resin of a polyvinyl alcohol polymer comprising carboxylated anionic monomer units and vinyl alcohol monomer units and optionally vinyl acetate monomer units, and wherein the carboxylated anionic monomer unit is derived from a member selected from the group consisting of maleic acid, monoalkyl maleate, dialkyl maleate, maleic anhydride, and combinations thereof;
    ii. from about 85% to about 100% by weight of the second polyvinyl alcohol resin of a polyvinyl alcohol homopolymer or a homopolymer blend, wherein the homopolymers consist of vinyl alcohol monomer units and optionallyvinyl acetate monomer units;
  wherein the second polyvinyl alcohol resin has an average about 4% solution viscosity in deionised water at about 20° C. in a range of between about 8 mPa·s and less than about 12 mPa·s; and
  wherein the first side of the first water-soluble film is sealed to the second side of the second water-soluble film to create the at least first compartment between the first water-soluble film and the second water-soluble film,
  wherein the second polyvinyl alcohol resin comprises a blend of a first polyvinylalcohol homopolymer and a second polyvinylalcohol homopolymer, wherein the first polyvinyl alcohol homopolymer has an average viscosity in a range of between about 11 mPa·s and about 20 mPa·s, measured as a about 4% polyvinyl alcohol polymer solution in deionised water at about 20° C.; and the second polyvinyl alcohol homopolymer has an average viscosity in a range of between about 1 mPa·s and about 10 mPa·s, measured as a about 4% polyvinyl alcohol polymer solution in deionised water at about 20° C.

2. The water-soluble unit dose article according to claim 1, wherein the second polyvinyl alcohol resin comprises between about 90% and about 100%, by weight of the second polyvinyl alcohol resin, of the polyvinyl alcohol homopolymer or the polyvinyl alcohol homopolymer blend, and between about 0% and about 10%, by weight of the second polyvinyl alcohol resin, of the polyvinyl alcohol polymer comprising carboxylated anionic monomer units and vinyl alcohol monomer units and optionally vinyl acetate monomer units, wherein the carboxylated anionic monomer unit is derived from a member selected from the group consisting of maleic acid, monoalkyl maleate, dialkyl maleate, maleic anhydride, and combinations thereof.

3. The water-soluble unit dose article according to claim 1, wherein the individual polyvinyl alcohol homopolymers independently have an average degree of hydrolysis in a range of between about 75% and about 99%.

4. The water-soluble unit dose article according to claim 1, wherein:
  a. the first polyvinyl alcohol resin is present in a range of about 50% to about 95%, by weight of the first water-soluble film, or b. the second polyvinyl alcohol resin is present in a range of about 50% to about 95%, by weight of the second water-soluble film, or c. a mixture thereof.

5. The water-soluble unit dose article according to claim 1, wherein the carboxylated anionic monomer unit in the first water-soluble film is derived from a monoalkyl maleate unit.

6. The water-soluble unit dose article according to claim 1, wherein the second polyvinyl alcohol resin comprises a polyvinyl alcohol polymer comprising a carboxylated anionic monomer unit derived from a monoalkyl maleate unit, wherein the carboxylated anionic monomer unit is present in the polyvinyl alcohol polymer comprising a carboxylated anionic monomer unit in an average amount of at least about 3 mol. %.

7. The water-soluble unit dose article according to claim 1, wherein the first PVOH polymer in the first water soluble film has:
  a. an average 4% solution viscosity at about 20° C. of from about 10 mPa·s to about 40 mPa·s, measured as a about 4% polyvinyl alcohol polymer solution in deionised water at about 20° C., or b. an average degree of hydrolysis of about 60% to about 99%, or
c. a mixture thereof, and wherein the second PVOH polymer in the first water soluble film has:

d. an average about 4% solution viscosity at about 20° C. from about 3 mPa·s to about 30 mPa·s, measured as a about 4% polyvinyl alcohol polymer solution in deionised water at about 20° C.; or
e. an average degree of hydrolysis of from about 60% to about 99%; or
f. a mixture thereof.

8. The water-soluble unit dose article according to claim 1, wherein the polyvinyl alcohol polymer comprising carboxylated anionic monomer units and vinyl alcohol monomer units has:

a. an average about 4% solution viscosity at about 20° C. of from about 10 mPa·s to about 40 mPa·s, measured as a about 4% polyvinyl alcohol polymer solution in deionised water at about 20° C., or
b. an average degree of hydrolysis of about 60% to about 99%, or
c. a mixture thereof.

9. The water-soluble unit dose article according to claim 1, wherein in the first water-soluble film, the relative weight ratio of the first PVOH polymer and second PVOH polymer is between about 90/10 and about 10/90.

10. The water-soluble unit dose article according to claim 1 wherein the first water-soluble film and the second water-soluble film each independently comprise between about 0.1% and about 2.5%, by weight of the water-soluble film, of a surfactant.

11. The water-soluble unit dose article according to claim 1, wherein the first water-soluble film and the second water-soluble film each individually have a residual moisture content of at least about 4%, by weight of the water-soluble film, as measured by Karl Fischer titration.

12. The water-soluble unit dose article according to claim 1, wherein each film independently comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, aversive agents, surfactants, and combinations thereof.

13. The water-soluble unit dose article according to claim 12, wherein each film independently comprises one or more plasticizers in an amount in a range of between about 5% and about 50%, by weight of the individual film.

14. The water-soluble unit dose article according to claim 1, wherein the first water-soluble film and the second water-soluble film are sealed via solvent sealing, heat sealing, or a mixture thereof.

15. The water-soluble unit dose article according to claim 1, wherein the unit dose article comprises at least a second compartment.

16. The water-soluble unit dose article according to claim 1, wherein the household care composition is selected from the group consisting of light duty liquid detergents compositions, heavy duty liquid detergent compositions, hard surface cleaning compositions, laundry detergent gels, bleaching compositions, laundry additives, fabric enhancer compositions, shampoos, body washes, other personal care compositions, and mixtures thereof.

17. A process of making a water-soluble unit dose article according to claim 1, comprising the steps of:

a. deforming the first water-soluble film in a mould to create an open cavity via thermoforming, vacuum forming, or a combination thereof;
b. filling the at least one open cavity with the household care composition;
c. closing the open filled cavity with the second water-soluble film;
d. sealing the first water-soluble film and the second water-soluble film to create the water-soluble unit dose article.

18. The process according to claim 17, wherein the first water-soluble film and the second water-soluble film are sealed via solvent sealing.

* * * * *